(12) United States Patent
Hayase

(10) Patent No.: US 8,184,945 B2
(45) Date of Patent: May 22, 2012

(54) AUTHORING DEVICE AND AUTHORING METHOD

(75) Inventor: Ken Hayase, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 133 days.

(21) Appl. No.: 12/644,893

(22) Filed: Dec. 22, 2009

(65) Prior Publication Data

US 2010/0158487 A1    Jun. 24, 2010

(30) Foreign Application Priority Data

Dec. 24, 2008  (JP) ................................ 2008-328786

(51) Int. Cl.
  H04N 9/80    (2006.01)
  H04N 5/93    (2006.01)
(52) U.S. Cl. ................... 386/241; 386/248; 386/278
(58) Field of Classification Search .............. 386/230, 386/241, 248, 278, 282, 343, 344, 351
  See application file for complete search history.

(56) References Cited

U.S. PATENT DOCUMENTS

| | | | |
|---|---|---|---|
| 6,404,925 | B1 | 6/2002 | Foote et al. |
| 6,774,917 | B1 | 8/2004 | Foote |
| 162,035 | A1 | 8/2005 | Takefumi et al. |
| 119,104 | A1 | 1/2006 | Tsutomu et al. |
| 7,630,986 | B1 | 12/2009 | Herz et al. |
| 7,739,598 | B2 | 6/2010 | Porter et al. |
| 7,757,172 | B2 | 7/2010 | Yokoi |
| 7,970,257 | B2 | 6/2011 | Momosaki |
| 2002/0175997 | A1 | 11/2002 | Takata |
| 2006/0044446 | A1 | 3/2006 | Porter et al. |
| 2008/0144890 | A1 | 6/2008 | Ogawa |
| 2008/0247600 | A1 | 10/2008 | Date et al. |
| 2009/0074304 | A1* | 3/2009 | Momosaki ................ 382/224 |
| 2009/0172032 | A1 | 7/2009 | Isobe et al. |
| 2009/0172545 | A1 | 7/2009 | Yokoi |
| 2009/0185745 | A1 | 7/2009 | Momosaki |
| 2010/0074590 | A1* | 3/2010 | Momosaki ................ 386/52 |

(Continued)

FOREIGN PATENT DOCUMENTS

GB     2395852 A     6/2004

(Continued)

OTHER PUBLICATIONS

Explanation of Non-English Language References.

(Continued)

Primary Examiner — Robert Chevalier
(74) Attorney, Agent, or Firm — Knobbe, Martens, Olson & Bear, LLP

(57) ABSTRACT

According to one embodiment, an authoring apparatus configured to generate writing data to be stored in an optical disc from a video content data, includes an indexing processor configured to generate face image indexing information includes face images extracted from the video content data and time stamp information representing a time point at which each extracted face image appears in the video content data, a setting module configured to set segments along with a time axis in the video content data, wherein a number of the segments is not larger than a number of chapters being able to be set in the writing data, and a generation module configured to generate menu screen data for displaying a menu screen displaying buttons on a display screen, the buttons on which face images are displayed respectively and for jumping to the segments in which the face images appearing.

6 Claims, 13 Drawing Sheets

U.S. PATENT DOCUMENTS

2010/0104145 A1* 4/2010 Momosaki ................... 382/118

FOREIGN PATENT DOCUMENTS

| JP | 2000-312310 A | 11/2000 |
|---|---|---|
| JP | 2000-322450 | 11/2000 |
| JP | 2000-322450 A | 11/2000 |
| JP | 2000-350156 A | 12/2000 |
| JP | 2001-167110 A | 6/2001 |
| JP | 2001-298711 A | 10/2001 |
| JP | 2002-185889 A | 6/2002 |
| JP | 2003-046911 A | 2/2003 |
| JP | 3634643 | 1/2005 |
| JP | 2006-080621 A | 3/2006 |
| JP | 2006-510240 A | 3/2006 |
| JP | 2007-280325 A | 10/2007 |
| JP | 2007-281680 A | 10/2007 |
| JP | 4066454 | 1/2008 |
| JP | 2008-276707 A | 11/2008 |
| JP | 2009-159507 | 7/2009 |
| JP | 2009-164828 A | 7/2009 |
| JP | 2009-177411 | 8/2009 |
| JP | 2009-182876 A | 8/2009 |
| WO | WO 02/49354 A1 | 6/2002 |
| WO | WO 2004/051656 A1 | 6/2004 |

OTHER PUBLICATIONS

Kubota et al., "Kao de Navi' (registered trade mark) Configured to Easily Retrieve Video Scenes", "Toshiba review", Toshiba, Nov. 1, 2008, pp. 54-57, vol. 63, No. 11, Japan.

Decision of Rejection mailed by Japan Patent Office on Jun. 8, 2010 in the corresponding Japanese patent application No. 2008-328786.

Notice of Reasons for Rejection mailed by Japan Patent Office on Mar. 2, 2010 in the corresponding Japanese patent application No. 2008-328786.

Explanation of Non-English Language References previously submitted in U.S. Appl. No. 12/549,849.

Final Notice of Rejection for Japanese Patent Application No. 2008-274513 mailed by the Japan Patent Office on Jan. 26, 2010 along with an English translation thereof and Statement of Accuracy of Translation in five (5) pages.

Notice of Reasons for Rejection mailed by Japan Patent Office on Oct. 27, 2009 in the corresponding Japanese patent application No. 2008-274513.

* cited by examiner

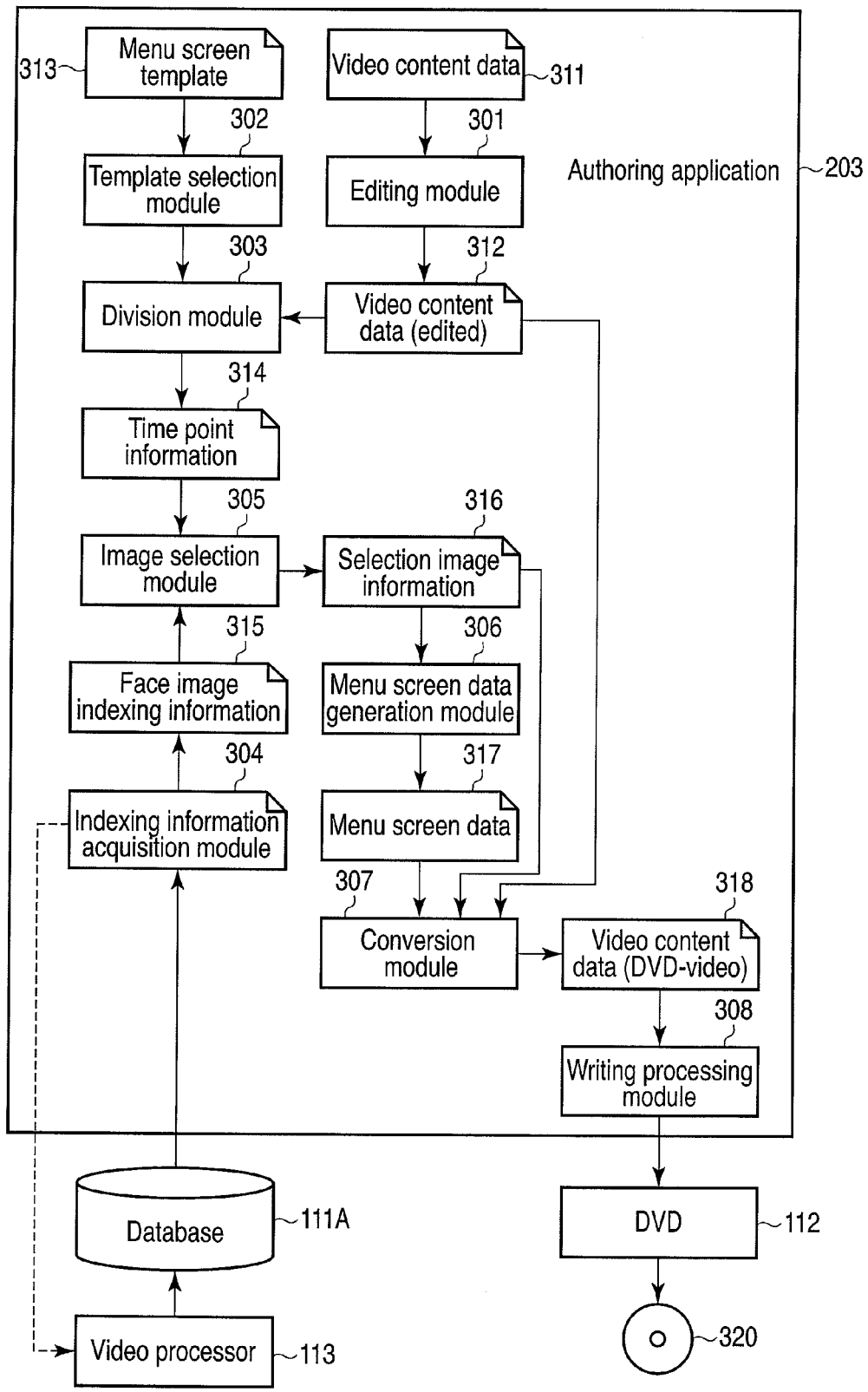
F I G. 4

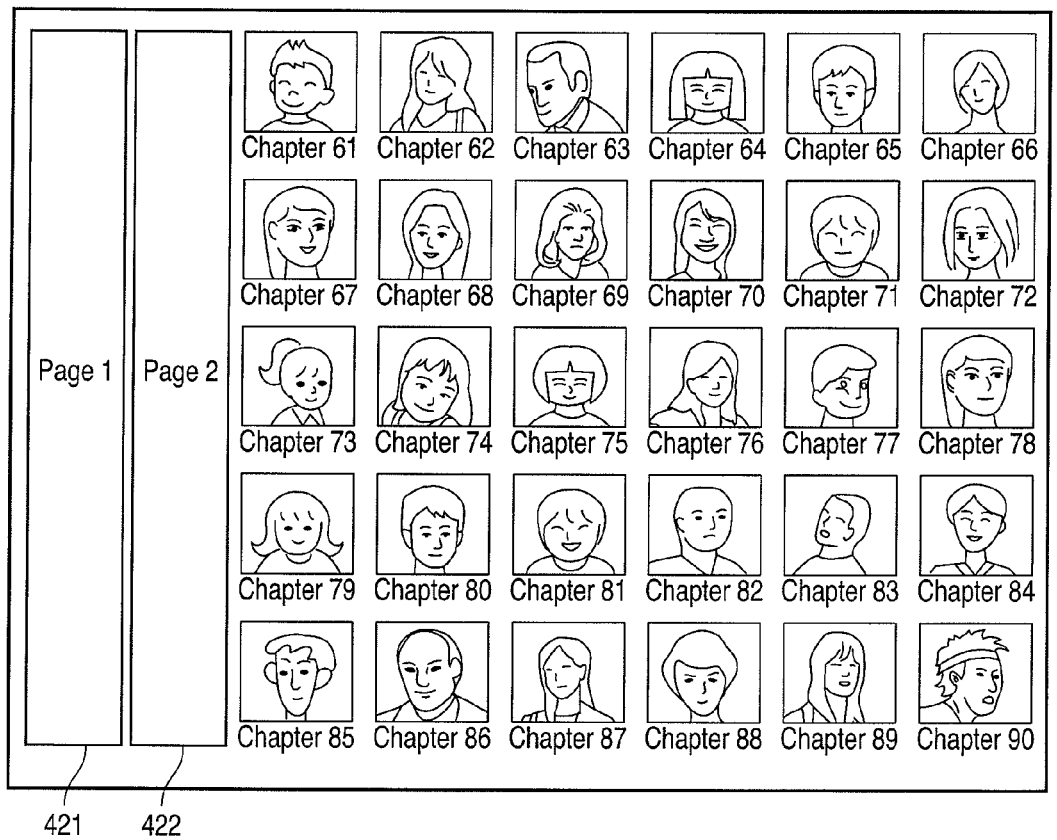
F I G. 13

US 8,184,945 B2

AUTHORING DEVICE AND AUTHORING METHOD

CROSS-REFERENCE TO RELATED APPLICATIONS

This application is based upon and claims the benefit of priority from Japanese Patent Application No. 2008-328786, filed Dec. 24, 2008, the entire contents of which are incorporated herein by reference.

BACKGROUND

1. Field

One embodiment of the invention relates to an authoring device and an authoring method configured to generate data for storing video content data in an optical disc.

2. Description of the Related Art

A technique of detecting a face image to be displayed in video content data stored in a hard disk drive, easily finding what kind of person appears in the content, and creating a menu for easily playback the content data from a place where a user desires to see the content on the basis of the displayed face, has been developed.

The functionality for displaying a list of highlights of a video and of graphically displaying a face of performers and changes in audio scene by applying a video indexing (video content analysis) technique are disclosed in "'Kao de Navi' (registered trade mark) configured to easily retrieve video scenes", "Toshiba review", Toshiba, Nov. 1, 2008, volume 63, number 11, page 54-page 57, HIDETOSHI KUBOTA and 3 other persons.

When creating a menu for the video content stored in the hard disk drive, the aforementioned functions hardly restrict to the creation of the menu. However, content stored in an optical disc such as a DVD-Video limits the number of chapters capable of being created and the number of jump buttons in one screen for jumping to chapters, thus it is hard to automatically create such menu.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 4 is an exemplary block diagram depicting a configuration of an authoring application program of the embodiment;

FIG. 13 is an exemplary view depicting an example of a menu screen.

DETAILED DESCRIPTION

Figure 1:
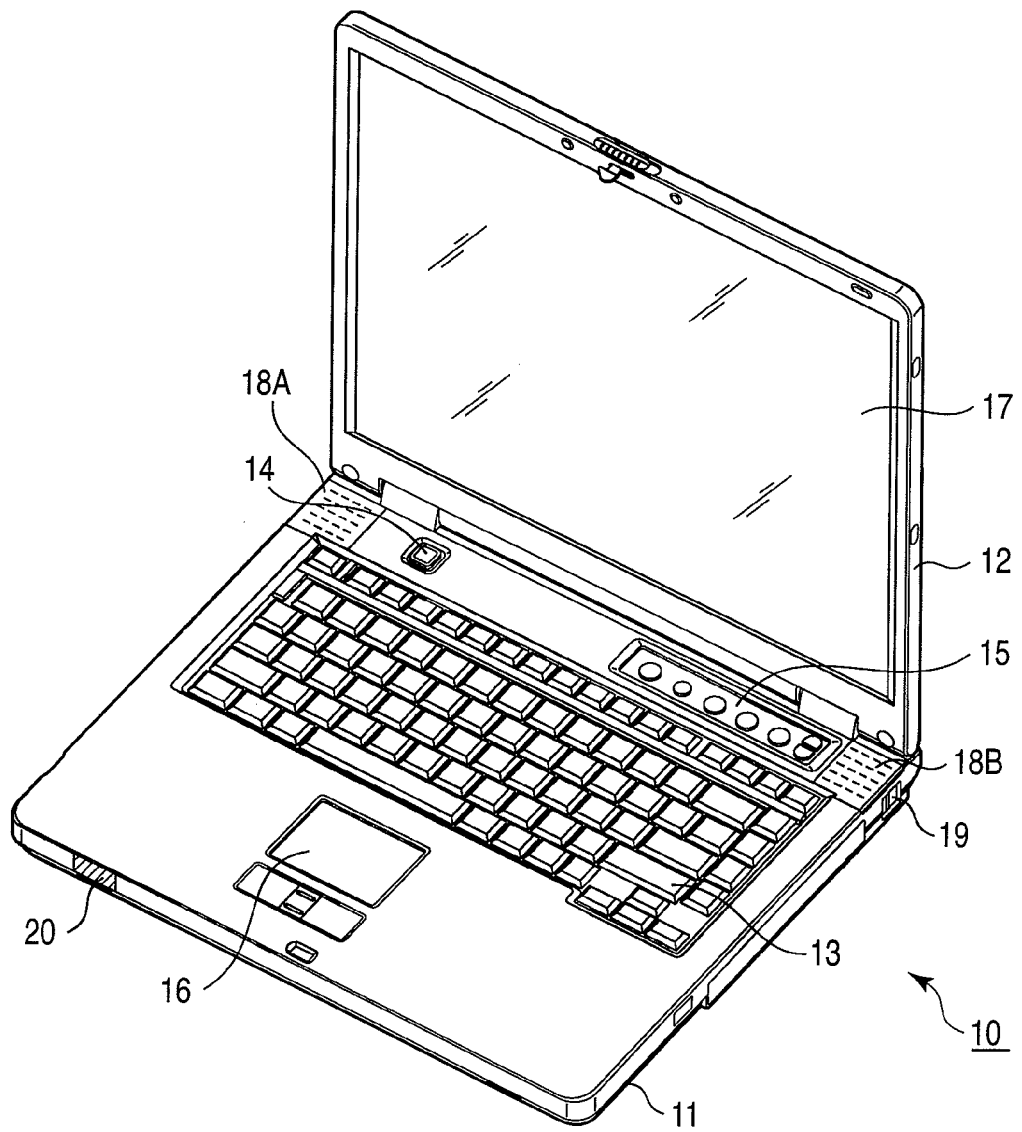
FIG. 1 is an exemplary perspective view depicting an example of an exterior appearance of an authoring device regarding one embodiment of the invention.

Various embodiments according to the invention will be described hereinafter with reference to the accompanying drawings. In general, according to one embodiment of the invention, an authoring apparatus configured to generate writing data to be stored in an optical disc from a video content data, comprises an indexing processor configured to generate face image indexing information comprising face images extracted from the video content data and time stamp information representing a time point at which each extracted face image appears in the video content data, a setting module configured to set segments along with a time axis in the video content data, wherein a number of the segments is not larger than a number of chapters being able to be set in the writing data, a selection module configured to select a single face image from the face images appearing in each segment based on the face image indexing information for each segment set by the setting module, a generation module configured to generate menu screen data for displaying a menu screen displaying buttons on a display screen, the buttons on which the selected face images are displayed respectively and for jumping to the segments in which the selected face images appearing, and a generating module configured to generate the writing data comprising information of the video content data, the menu screen data generated by the generation module, and an information for jumping to each of the segments on the basis of time stamp information.

Hereinafter, an embodiment of the invention will be described with reference to the drawings.

Firstly, a configuration of an electronic device regarding the invention will be described with reference to FIGS. 1 and 2. The electronic device of the embodiment is achieved, for example, by a notebook-type portable personal computer 10 functioning as an information processor.

The computer 10 may record and playback video content data (audio visual content data) such as broadcasting program data and video data input from an external device. That is, the computer 10 has a television (TV) function of displaying and recording broadcasting program data broadcasted through a TV broadcasting signal. This TV function is achieved, for example, by a TV application program pre-installed in the computer 10. The computer 10 also has a function of recording video data input from an external AV device, and a function of reproducing the recorded video data and recorded broadcasting program data.

Further, the computer 10 has a face image list display function for displaying a list of face images of persons appearing in the video content data such as and broadcasting program data stored in the computer 10. The face image list displaying function is incorporated, for example, as one of the TV functions. The face image list displaying function is one of video indexing functions of presenting a summary of the video content data to a user. The face list display function may present, to the user, which person appears in which time zone of the entire body of video content data. The face image list display function may also display a list of persons by paying attention to a prescribed attitude segment included in the video content data.

FIG. 1 is a perspective view in a state in which a display unit of the computer 10 is opened. The computer 10 is composed of a computer main unit 11 and a display unit 12. The display unit 12 has a built-in display device consisting of a thin film transistor liquid crystal display (TFD-LCD) 17.

The display unit 12 is attached to be freely rotatable between an open position in which the upper surface of the computer main unit 11 is exposed and a closed position in which the upper surface of the computer main unit 11 is covered. The computer main unit 11 is formed as a thin box, and a keyboard 13, a power button 14 for turning on/off the computer 10, an input operation panel 15, a touch pad 16, loudspeakers 18A, 18B, etc., are arranged on the upper surface of the computer main unit 11.

The operation panel 15 is an input device inputting an event corresponding to a pressed button, and includes a plurality of buttons for activating the plurality of functions, respectively. A group of these buttons includes an operation button group for controlling a TV function (viewing, recording, reproducing recorded broadcasting program data/video data). The front surface of the computer main unit 11 is provided with a remote control unit interface unit 20 for communicating with a remote control unit remotely controlling the TV functions of the computer 10. The interface unit 20 is composed of an infra-red light reception unit, etc.

An antenna terminal 19 for TV broadcasting is provided, for example, on a right side face of the computer main unit 11. For instance, on a rear face of the computer main unit 11, an external display connection terminal, which is compatible with, for example, the high-definition multimedia interface (HDMI) standard, is provided. The external display connection terminal is used to output video data (moving image data) included in video content data such as broadcasting program data to an external display.

Next, a system configuration of the computer 10 will be described with reference to FIG. 2.

Figure 2:
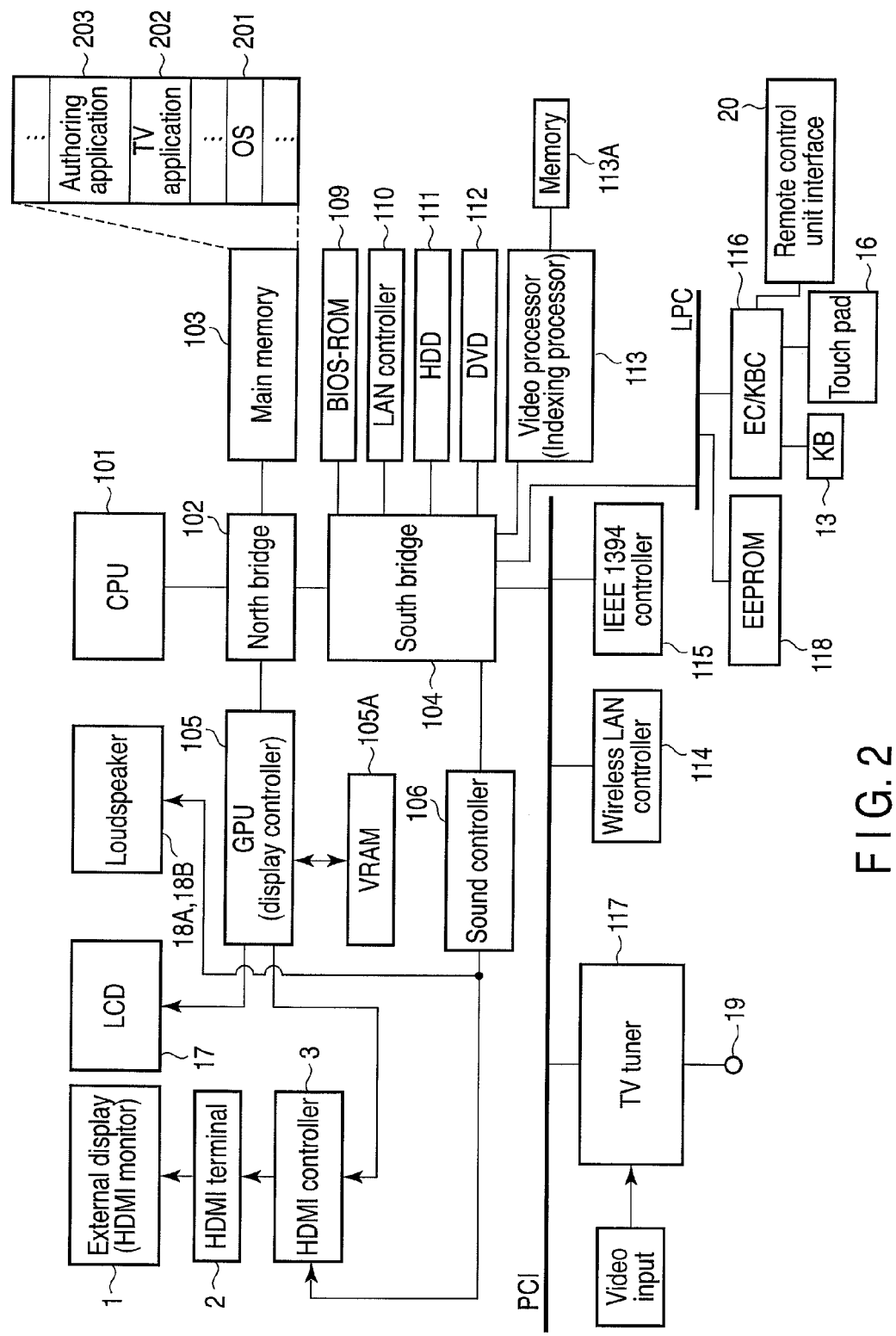
FIG. 2 is an exemplary block diagram depicting an example of a system configuration of the authoring device of the embodiment.

As shown in FIG. 2, the computer 10 includes a CPU 101, a north bridge 102, a main memory 103, a south bridge 104, a graphics processing unit (GPU) 105, a video memory (VRAM) 105A, a sound controller 106, a BIOS-ROM 109, a LAN controller 110, a hard disk drive (HDD) 111, a DVD drive 112, a video processor 113, a memory 113A, a wireless LAN controller 114, an IEEE 1394 controller 115, an embedded controller/keyboard controller IC (EC/KBC) 116, a TV tuner 117, and an electrically erasable programmable read-only memory (EEPROM) 118.

The CPU 101 is a processor that controls operations of the computer 10, and executes various applications such as an operation system (OS) 201, and various application programs such as a TV application program 202 and an authoring application program 203 which are loaded on the main memory 103 from the HDD 111. The TV application program 202 is software for executing the TV functions.

The TV application program 202 executes live playback processing for viewing the broadcasting program data received by the TV tuner 117, recording processing recording the received broadcasting program data in the HDD 111, and playback processing playing back broadcasting program data/video data recorded in the HDD 111. The authoring application program 203 executes processing for authoring the video content data, processing for creating a menu screen, processing for converting the video content data and the menu screen into data in the DVD-Video format, and processing for writing the converted data in a DVD-R disc for creating a DVD in the DVD-Video format from the video content data stored in the HDD 111.

The CPU 101 also executes a basic input output system (BIOS) stored in the BIOS-ROM 109. The BIOS is a program for controlling hardware.

The north bridge 102 is a bridge device connecting a local bus of the CPU 101 to the south bridge 104. The north bridge 102 includes a built-in memory controller controlling access to the main memory 103. The north bridge 102 has a function for communication with the GPU 105 through a serial bus, etc., in a PCI EXPRESS standard.

The GPU 105 is a display controller controlling an LCD 17 to be used as a display monitor of the computer 10. The display signal generated by the GPU 105 is transmitted to the LCD 17. The GPU 105 may also transmit a digital video signal to an external display device 1 through an HDMI controller 3 and an HDMI terminal 2.

The HDMI terminal 2 is the aforementioned external display connection terminal. The HDMI terminal 2 may transmit a non-compressed digital display video signal and a digital audio signal to the external display device 1, such as a TV receiver, through a single cable. The HDMI controller 3 is an interface for transmitting the digital video signal to the display device 1 through the HDMI terminal 2.

The south bridge 104 controls each device on a low pin count (LPC) bus and each device on a peripheral component interconnect (PCI) bus. The south bridge 104 has a built-in integrated drive electronics (IDE) controller for controlling the HDD 111 and the DVD drive 112. Further, the south bridge 104 also has a function of communication with the sound controller 106.

In addition, the video processor 113 is connected to the south bridge 104 through a serial bus in PCI EXPRESS standards.

The video processor 113 is a processor executing various kinds of processing concerning the foregoing video indexing. The video processor 113 functions as an indexing processing unit for executing video indexing processing. That is, in the video indexing processing, the video processor 113 extracts a plurality of face images from moving image data included in the video content data, and outputs time stamp information showing a time point at which each extracted face image appears in the video content data. The extraction of the face images is executed, for example, through face detection processing detecting a face area from a frame search of the moving image data, and cut-out processing for cutting out the detected face area from a frame. The detection of the face area may be performed, for example, by analyzing a feature of an image of each frame, and by searching areas each having features similar to prepared face image feature samples. The face image feature samples are feature data obtained by statistically processing each face image feature of a large number of persons.

The memory 113A is used as a work memory of the video processor 113. A large amount of computation is needed to execute the video indexing processing. In the embodiment, the video processor 113, which is an exclusive processor differing from the CPU 101, is used as a back end processor, and the video processor 113 executes the video indexing processing. Therefore, the video indexing processing may be executed without an increase in load on the CPU 101.

The sound controller 106 is a sound source device, and outputs audio data to be reproduced to the loudspeakers 18A, 18B or the HDMI controller 3.

The wireless LAN controller 114 is a wireless communication device executing wireless communication, for example, in accordance with the IEEE 802.11 standard. The IEEE 1394 controller 115 executes communication with the external device through the serial bus in accordance with the IEEE 1394 standard.

The EC/KBC 116 is a single chip microcomputer with an embedded controller for power management, and a keyboard controller for controlling a Keyboard (KB) 13 and a touch pad 16 integrated therein. The EC/KBC 116 has a function of turning on/off the computer 10 in response to the operations of the power button 14 by the user. Further, the EC/KBC 116 has a function of communicating with the remote control interface 20.

The TV tuner 117 is a reception device receiving the broadcasting program data broadcasted through the TV broadcasting signal, and is connected to the antenna terminal 19. The TV tuner 117 is achieved, for example, as a digital TV tuner that can receive digital broadcasting program data such as a terrestrial digital TV broadcast. The TV tuner 117 has a function of capturing video data input from the external device.

Figure 3:
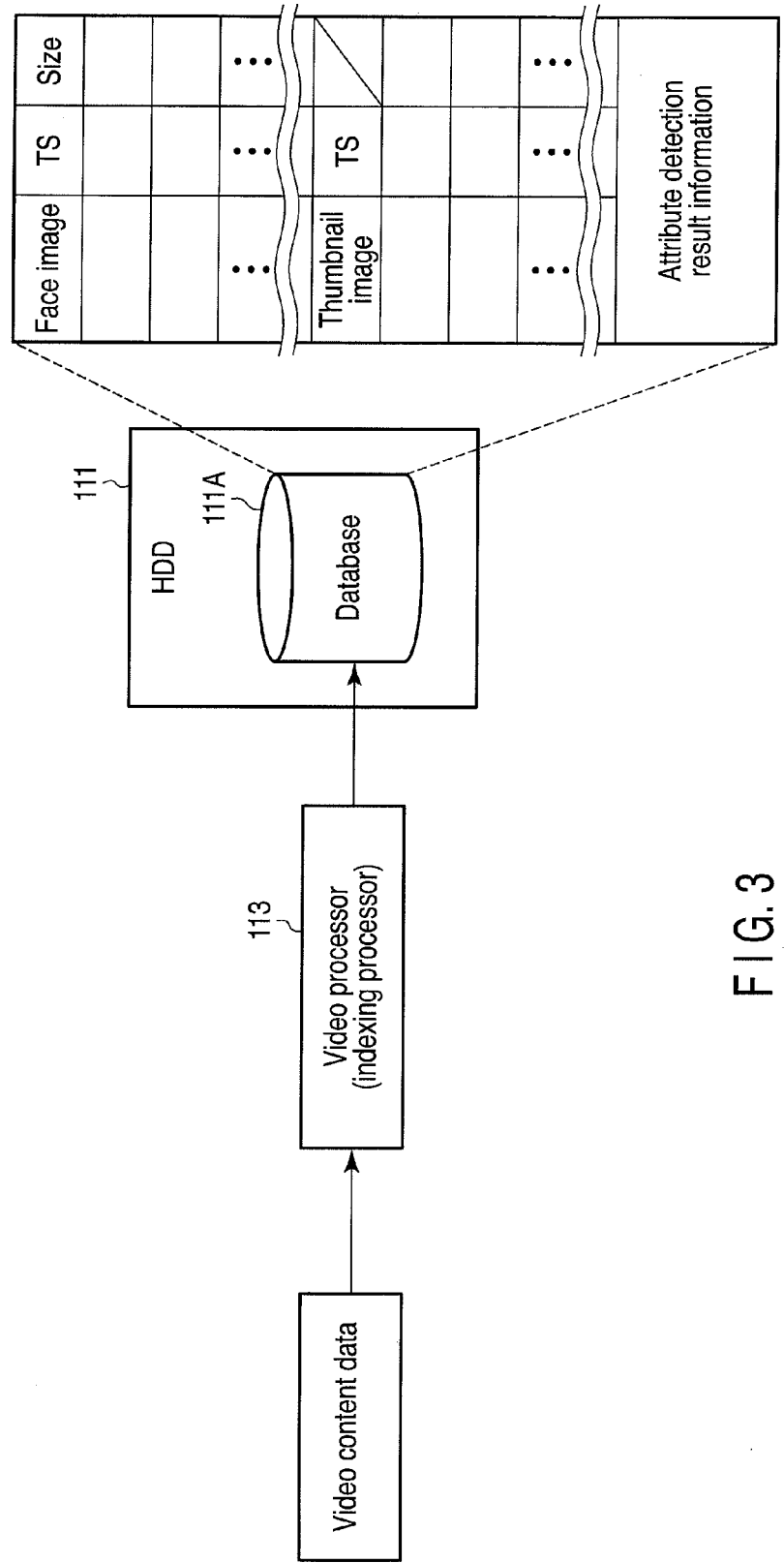
FIG. 3 is an exemplary block diagram for explaining a face image extracting function of the authoring device of the embodiment.

Indexing processing to be executed by means of the video processor 113 will be described with reference to FIG. 3.

The video indexing processing of the video content data such as broadcasting program data is executed by the video processor 113 functioning as the indexing processor, as described above.

The video processor 113 executes the indexing processing of the video content data, such as recorded broadcasting program data specified by the user under the control by the TV application program 202 of the authoring application program 203. The video processor 113 may execute the video indexing processing for the broadcasting program data while recording processing for storing the broadcasting program data received by the TV tuner 117 in the HDD 111.

In the video indexing processing (also referred to as face image indexing processing), the video processor 113 analyzes, in frames, the moving image data included in the video content data. The video processor 113 extracts face images of persons from a plurality of frames consisting of the moving image data, respectively, and outputs time stamp information showing a time point at which each extracted face image appears in the video content data. In terms of time stamp information corresponding to each face image, an elapsed time until the face image appears from a start of the video content data, or a number of a frame in which the face image has been extracted may be used.

Further, the video processor 113 outputs a size (resolution) of each extracted face image. Face detection result data (face image, time stamp information TS, and size) to be output from the video processor 113 is stored as face image indexing information 315 in a database 111A. The database 111A is a storage area for indexing data storage prepared in the HDD 111.

In addition, in the video indexing processing, the video processor 113 executes thumbnail image acquisition processing while processing for extracting face images. Thumbnail images are images corresponding to a plurality of frames (reduced-size images), respectively, extracted from the video content data, for example, at equivalent time intervals. That is, the video processor 113 extracts frames one by one, for example, at prescribed equivalent time intervals from the video content data, and outputs images (thumbnail images) corresponding to the respective extracted frames and time stamp information TS showing the time points at which the thumbnail images appear. Thumbnail image acquisition result data (thumbnail, time stamp information TS) output from the video processor 113 is also stored, as thumbnail indexing information, in the database 111A.

Next, authoring processing to be executed through the authoring application program 203 will be described.

The authoring application program 203 includes an editing module 301, a template selection module 302, a division module 303, an indexing information acquisition module 304, an image selection module 305, a menu screen data generation module 306, a conversion module 307, and a writing processing module 308.

The editing module 301 edits video content data 311 in response to operations by the user to output edited video content data 312. The video content data 311 is not edited in some case.

In a menu screen template 313, a plurality of templates of menu screens displayed when the DVD-Video is reproduced the first time have been registered. A plurality of jump buttons for jumping to chapters set through operations by the user are arranged on the menu screen in the menu screen template 313. The menu screen may be composed of one page or a plurality of pages. The total number of arranged jump buttons is the smallest number configured to set chapters in the video content to be stored in an optical disc. For instance, in the case of a DVD-Video, the number is equivalent to 999.

Figure 5:
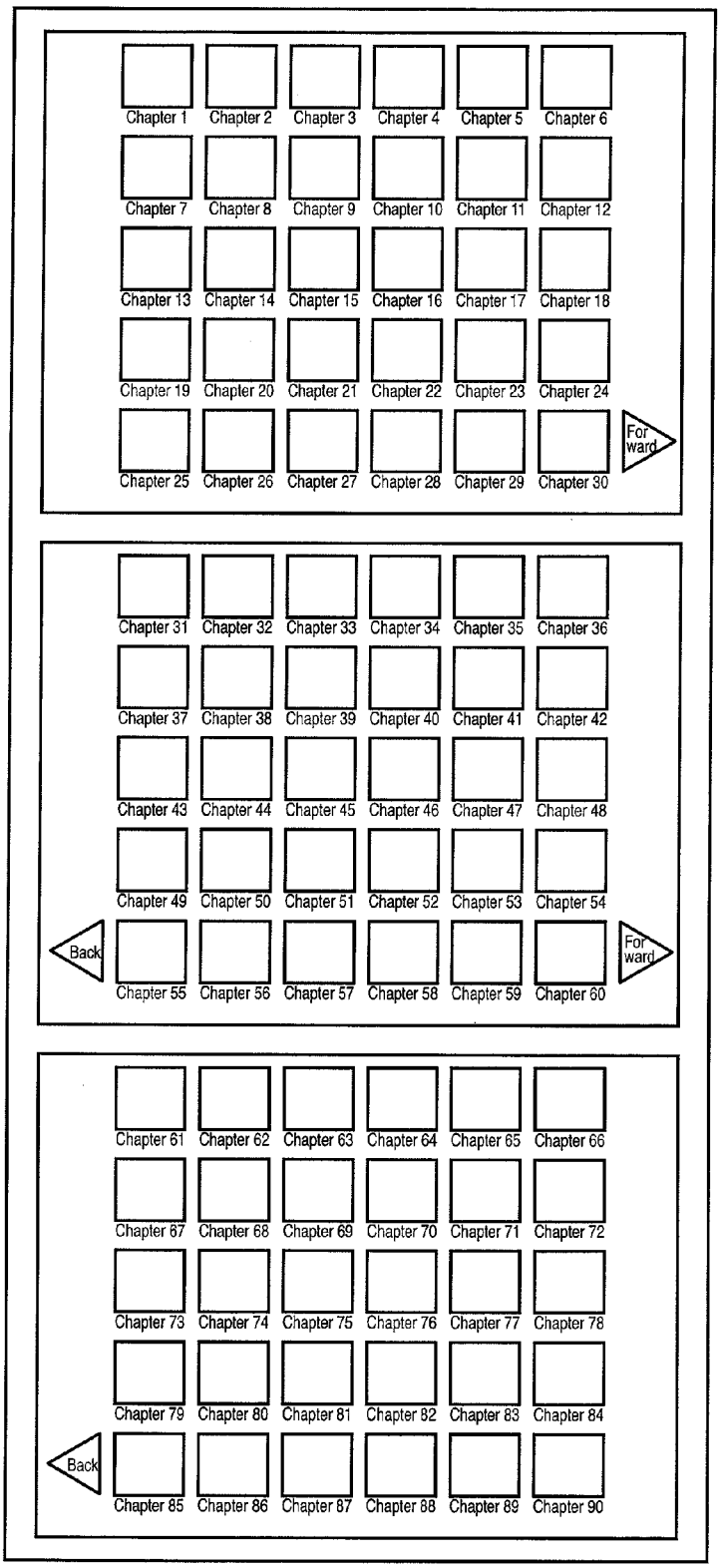
FIG. 5 is an exemplary view depicting an example of a menu screen in a menu screen template of the embodiment.

The data generation module 306 makes the user select a single template among a plurality of templates registered in the menu screen template. The selection module 302 requests the division module 303 to divide the video content data 312 into a plurality of segments the number of which corresponds to the number of templates selected. The number corresponding to the number of templates is the number of all buttons jumping to the chapters set by the operations by the user among the selected templates. For instance, when the user selects the templates shown in FIG. 5, the number of buttons is 90.

Figure 6:
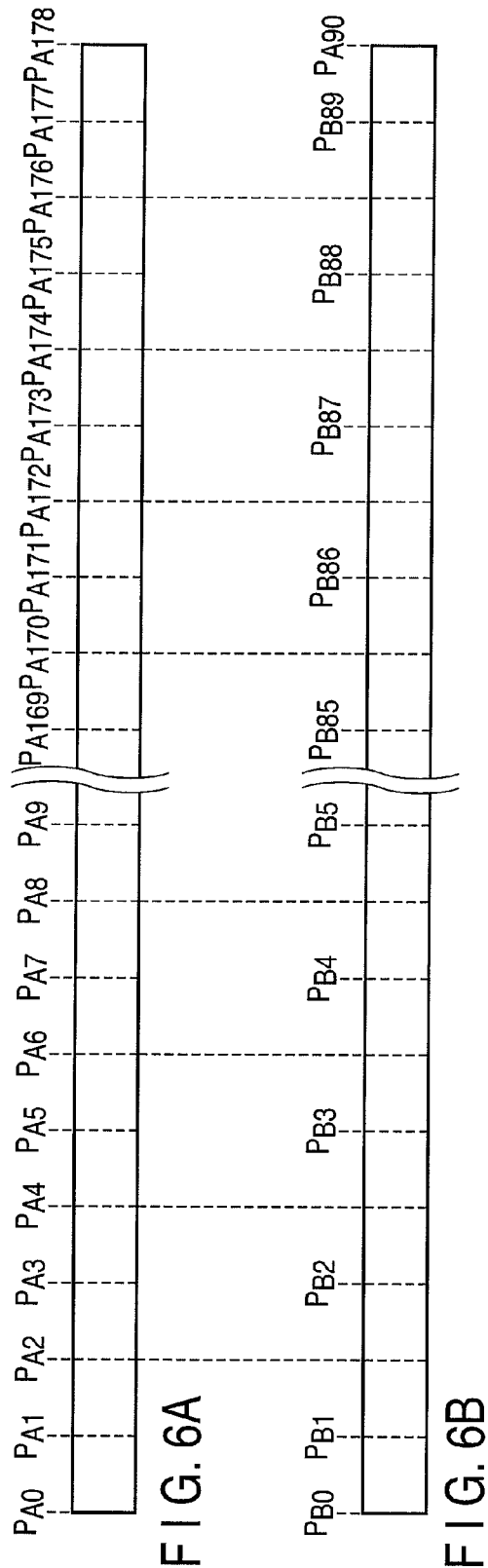
FIG. 6A and FIG. 6B are exemplary views depicting examples of division time points to be set in video content data.

To firstly set segments of (2N−2) of which the times are equal to one another in the video content data 312 along with a time axis, the division module 303 sets first division time points. For instance, in a case of a template shown in FIG. 5, to divide the video content data 312 into 178 segments, first division time points $P_{A0}$-$P_{A178}$ are set, as shown in FIG. 6A. Time information is actually set as the first division time points $P_{A0}$-$P_{A178}$.

Next, the division module 303 sets second division time points for setting two adjacent segments as new segments in turn from a head side of the video content data 312, except a segment including the head of the video content data 312 and a segment including the final piece of video content data 312. Similarly to a case of the first division time points, time information is set as the second division time points. By setting the second time points, the number of segments becomes equal to the total number of the buttons. For instance, as shown in FIG. 6A, the division module 303 sets the second division time points $P_{B0}$-$P_{B90}$ to the video content data 312 to which the first division time points are set, as shown in FIG. 6B, to divide the video content data 312 into 90 segments. The division module 303 outputs the time information of the set first division time points $P_{An}$ (n is an even number), and the set second division time points $P_{B0}$-$P_{B90}$ as division time point information 314.

An indexing information acquisition module 304 acquires face image indexing information 315 of the video content data 312 from the database 111A. In a case where the face image indexing information 315 of the video content data 312 has not been stored in the database 111A, the indexing information acquisition module 304 makes the video processor 113 execute the indexing processing to the video content data 312.

The image selection module 305 selects one item of the information of the face images that appear in a segment for each segment between adjacent two division time points on the basis of the time stamps owned by the division time point information 314 and by the face image indexing information 315 acquired by the indexing acquisition module 304. The selection module 305 selects the information of the face images that appear in a segment except the face images that appear in a fixed time from the top of the segment and face images that appear in a fixed time from the end of the segment. If a plurality of face images appear in the segment, the selection module 305 selects one item of the information of the face image that appear at a time closest to a central time of the segment. The central time means a time at the first division time point $P_{An}$ (n is even number). If no face image appears in the segment, the selection module 305 selects a thumbnail of the video displayed at the central time of the segment from the video content data 312. The selection module 305 selects a face image that appear at the top of the segment, namely, at the second division time point $P_{B0}$ for the segment (points $P_{B0}$-$P_{B1}$) including the top of the video content data 312. For the segment (points $P_{B89}$-$P_{B90}$) including the final piece of content data 312, the selection module 305 selects the face image that appears at the top of the segment, namely, at the second division time point $P_{B89}$. If no face image appears at the second division time point $P_{B80}$, or at the second division time point $P_{B89}$, the selection module 305 selects a thumbnail image of the image displayed at the second division time point $P_{B80}$ or at the second division time point $P_{B89}$. The selection module 305 outputs the information (face image, time stamp information TS) of the images selected for each segment, as selection image information 316.

The selection module 305 selects the face images or images closest to the center of each segment, which then enables preventing the time of the chapter from becoming too short. After setting the first division time point, the division module 303 sets the second division time point having adjacent segments as one segment. Thereby, the first division time point not overlapping with the second division time point becomes the center of the segment, and there is no need to newly calculate the time of the center in the segment.

Figure 7:
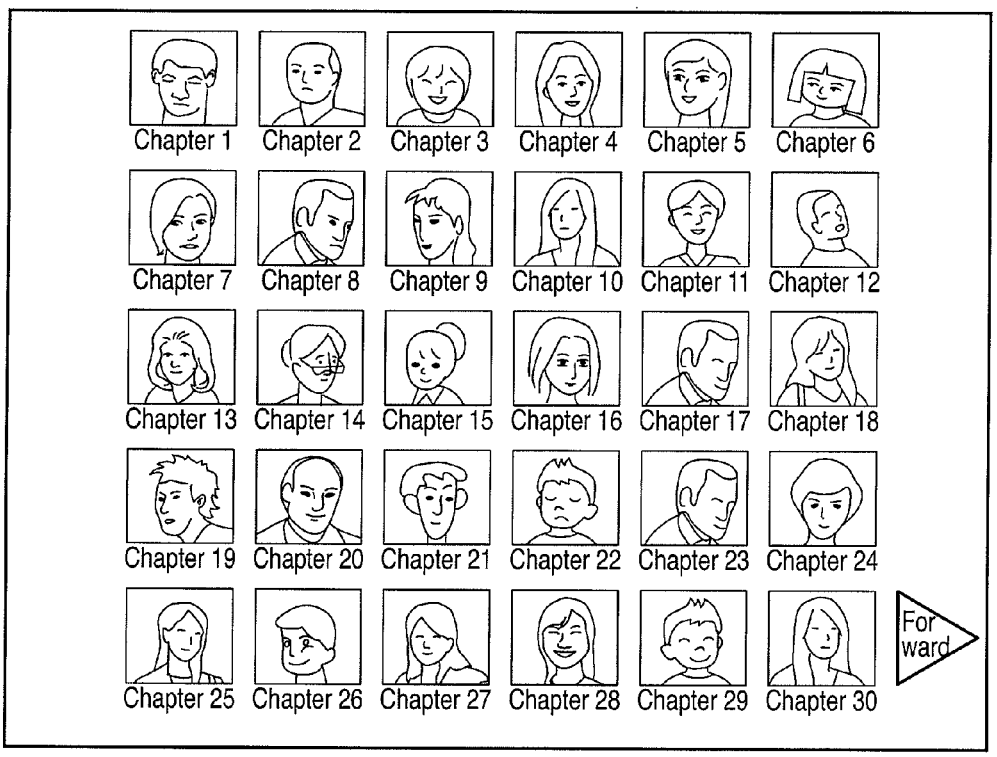
FIG. 7 is an exemplary view depicting an example of a menu screen.
Figure 8:
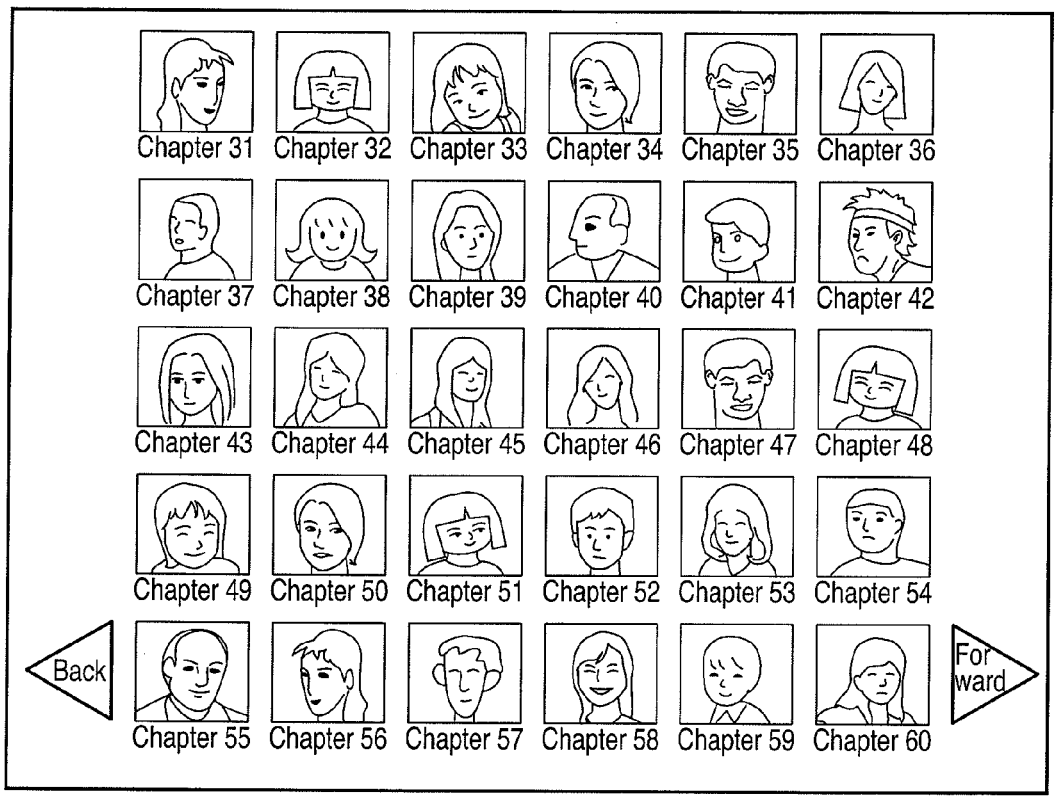
FIG. 8 is an exemplary view depicting an example of a menu screen.
Figure 9:
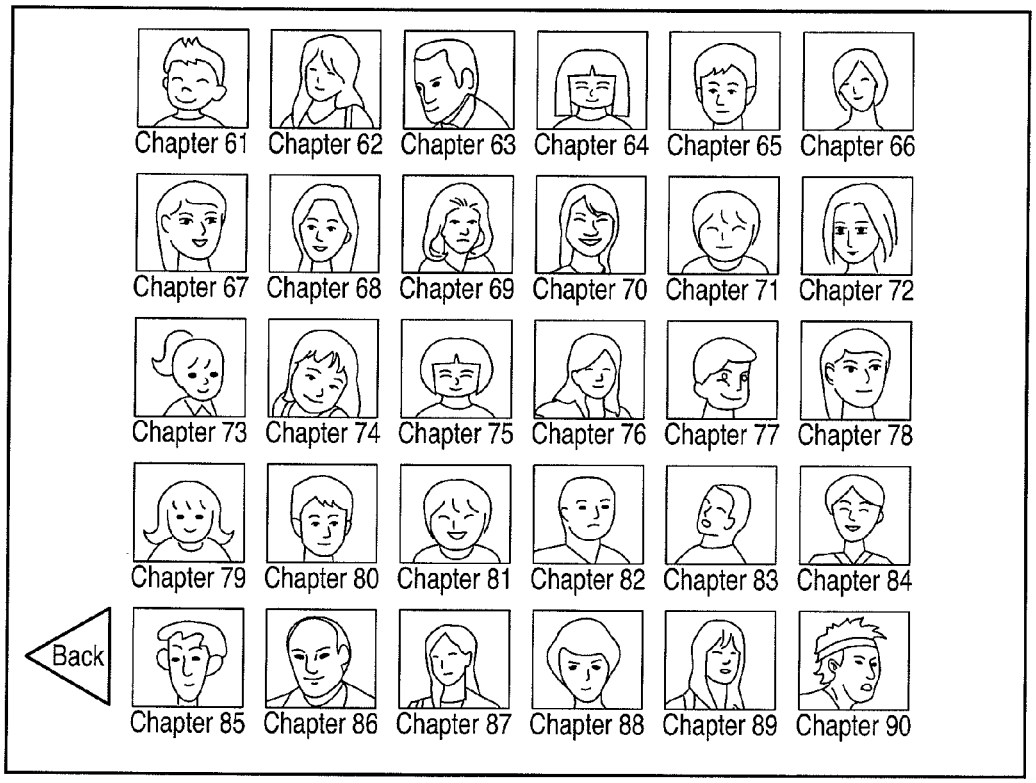
FIG. 9 is an exemplary view depicting an example of a menu screen.

The menu screen data generation module 306 generates the data of the menu screen displayed on the screen on the basis of the selection image information 316. The data generated by the data generation module 306 is output as menu screen data 317. The face images or thumbnail images selected by the image selection module 305 are displayed at jump buttons on the menu screen. FIGS. 7-9 show examples of the menu screens displayed on the screen by the generated data.

As shown in FIG. 7, jump buttons for jumping to chapters 1-30 are displayed on the menu screen. When the user operates a "forward" button on the menu screen, a menu screen of the next page shown in FIG. 8 is displayed on the screen. As shown in FIG. 8, jump buttons for jumping to chapters 31-60 are displayed on the menu screen. When the user operates a "Back" button on the menu screen, a menu screen of the previous page show in FIG. 7 is displayed on the screen. When the user operates the "forward" button on the menu screen, a menu screen of the next page shown in FIG. 9 is displayed on the menu screen. As shown in FIG. 9, the menu screen displays jump buttons for jumping to chapter 61-90. When the user operates the "Back" button, the menu screen of the previous page shown in FIG. 8 is displayed on the menu screen.

When completing the data generation of the menu screen, a conversion processing module 307 converts the video content data 312 into the data in the DVD-Video format on the basis of menu screen data 317 and selection image information 316 and outputs video content data 318 in the DVD-Video format. The data in the DVD-Video format includes information for jumping on the basis of the data on the menu screen and the operations of the jump button displayed on the menu screen. It is preferable for the data to be image data (ISO data) for writing in a DVD-R medium.

A writing processing module 308 executes writing processing of video content data 318 in a DVD-R medium 320 inserted into a DVD drive 112.

Figure 10:
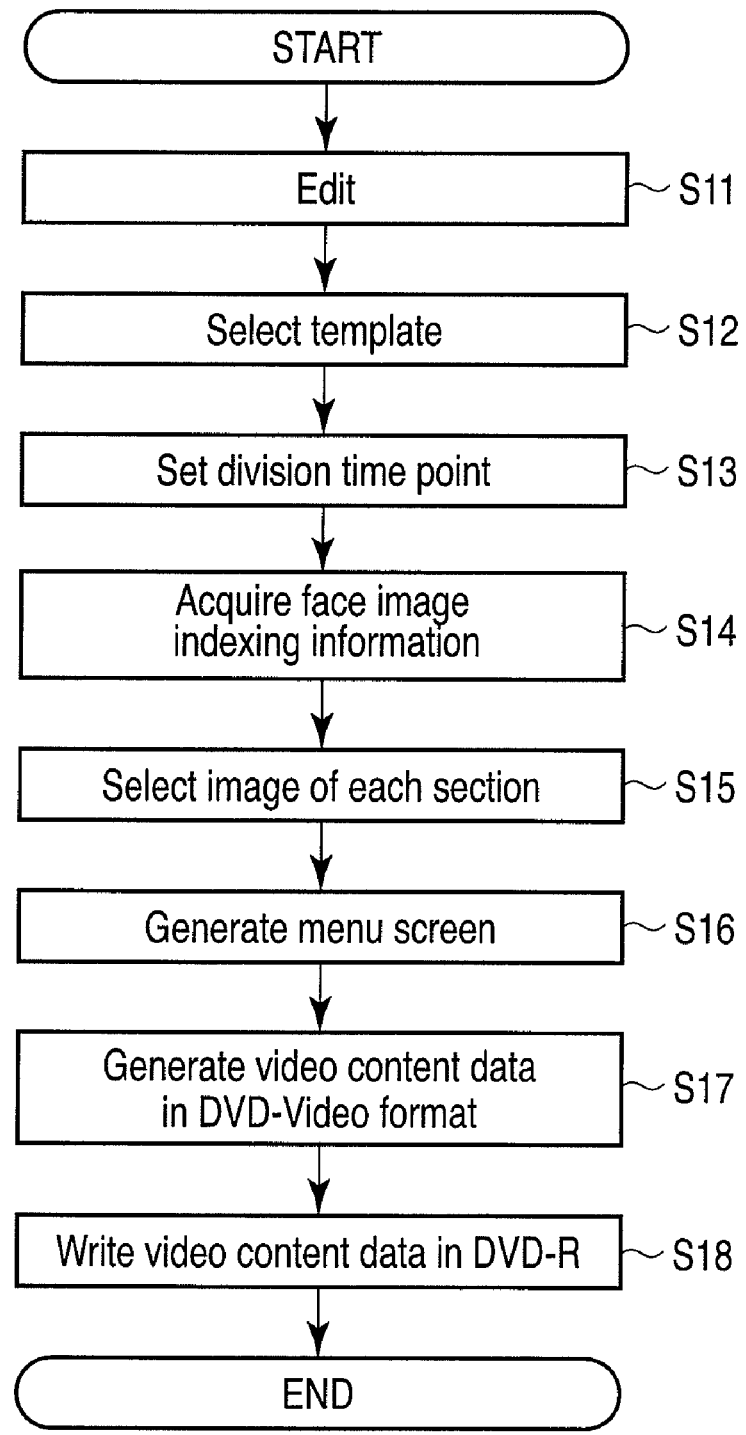
FIG. 10 is an exemplary flowchart depicting a procedure generating video content data in a DVD-Video format.

Next, a procedure implemented by the authoring application program 203 will be explained with reference to a flowchart of FIG. 10.

Firstly, the user edits the video content data 311 by using the editing module 301 (Block S11). After editing, the edit module 301 outputs the edited video content data 312.

Next, the user uses the selection module 302 to select the template on the menu screen (Block S12). The selection module 302 reports the total number of the jump buttons in the templates selected by the division module 303.

The division module 303 sets the first division time points and the second division time points for dividing the video content data 312 in the segments of the number equal to the reported total number of buttons, and outputs the division time point information 314 (Block S13). The division module 303 reports the time point information 314 to the selection module 305.

The selection module 305 requests the acquisition module 304 to acquire the face image indexing information 315. The acquisition module 304 acquires the indexing information 315 from the database 111A to report the indexing information 315 to the selection module 305 (Block S14)

The selection module 305 selects a single face image for each segment from the indexing information 315 for attaching to the jump button or a single thumbnail image from the video content data 312 (Block S15). The selection module 305 outputs the information on the selected image in each segment and time stamps as selection image information 316 to report the image information 316 to a menu screen generation module 306.

The generation module 306 uses the selection image information 316 to generate the menu screen, and outputs the menu screen data 317 (Block S16). The generation module 306 reports the menu screen data 317 to the conversion module 307.

The conversion module 307 uses the video content data 312, selection image information 316, and menu screen data 317 to generate the video content data 318 in the DVD-video format (Block S17). The conversion module 307 calls the writing processing module to report the generation of the video content data 318.

The writing processing module 308 executes the writing processing to write the video content data 318 in the DVD-R medium 320 loaded on the DVD drive 112 (Block S18).

According to the processing given above, selection of any template by the user enables displaying the menu screen having the jump buttons with the face images of the persons appearing in the video content data attached thereto, respectively, and enables automatically creating DVD-Video displaying the menu screen.

Figure 11:
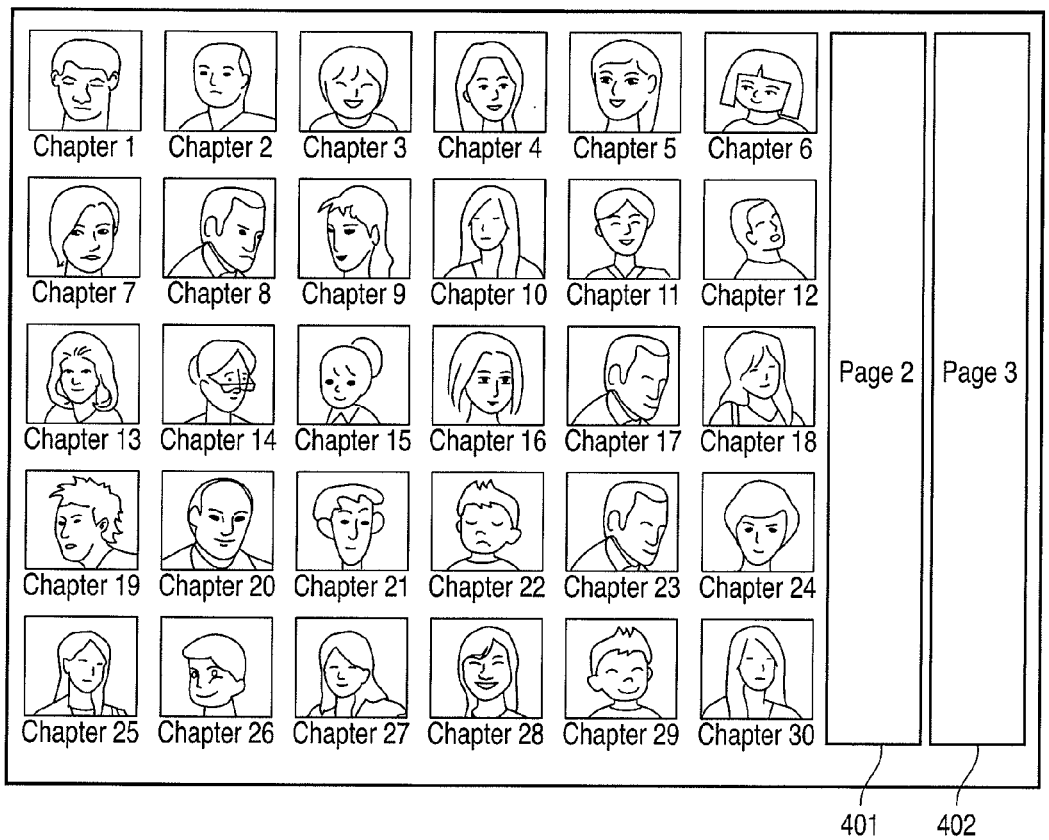
FIG. 11 is an exemplary view depicting an example of a menu screen.
Figure 12:
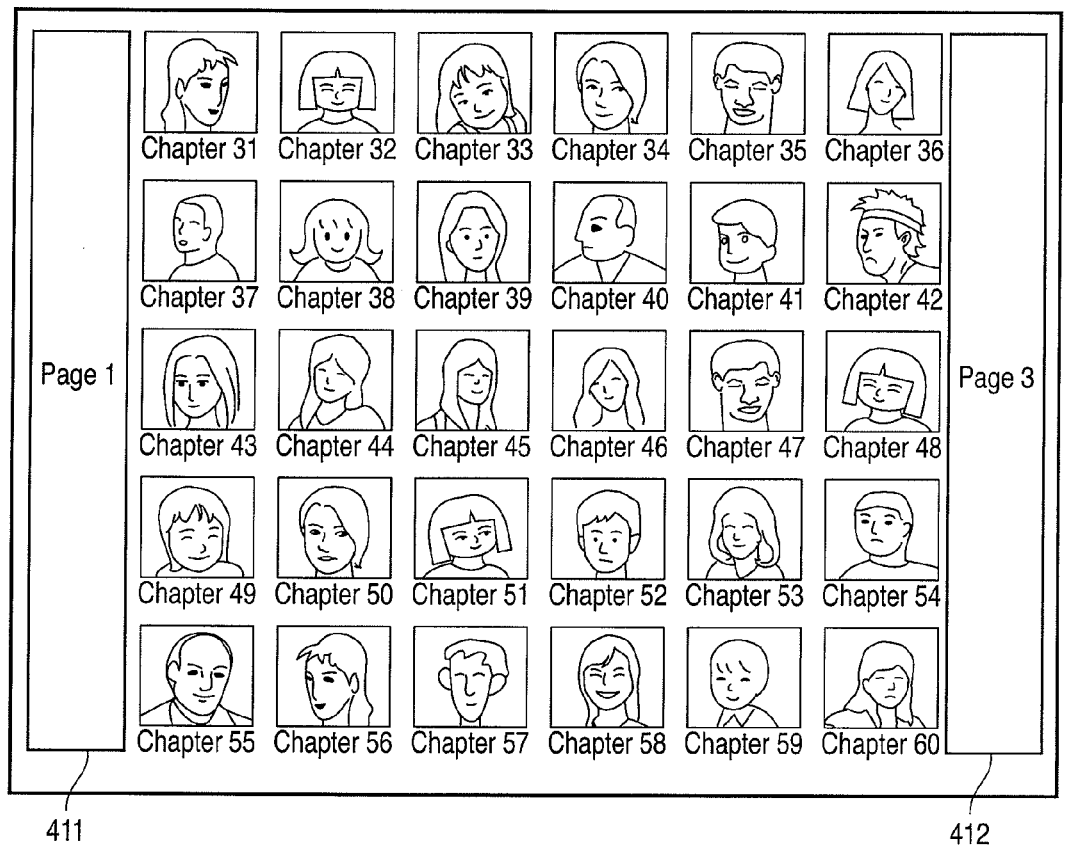
FIG. 12 is an exemplary view depicting an example of a menu screen.

While FIGS. 7-9 have described some examples, other examples will be described in FIGS. 11-13. Operating a button 401 in the menu screen shown in FIG. 11 displays a menu screen shown in FIG. 12. Operating a button 402 in the menu screen shown in FIG. 11 displays a menu screen shown in FIG. 13. Operating a button 411 in a menu screen shown in FIG. 12 displays a menu screen shown in FIG. 11. Operation a button 412 in the menu screen shown in FIG. 12 display a menu screen shown in FIG. 13. Operating a button 421 in the menu screen shown in FIG. 13 displays the menu screen shown in FIG. 11. Operating a menu button 422 in the menu screen shown in FIG. 13 displays the menu screen shown in FIG. 12.

While the examples given above have generated the video content data in the DVD-video format, the invention may generate video content data in a Blu-ray-Video format, and may write the generated data in a Blu-ray disc.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An authoring apparatus configured to generate data from a video content data, the data being used to reproduce the video content data and to be stored in an optical disc, comprising:
    an indexing processor configured to generate face image indexing information comprising face images in moving image data which is comprised in the video content data and time stamp information indicative of a time when each image appears in the video content data;
    a setting module configured to set segments along with a time axis in the video content data, wherein a number of the segments is equal to or smaller than a number of chapters;
    a selection module configured to select a face image in each segment based on the time stamp information comprised in the face image indexing information;
    a menu screen generator configured to generate menu screen data comprising buttons on a display screen, the buttons comprising the selected face images and to navigate to the segments comprising the selected face images; and
    a data generator configured to generate the data comprising information of the video content data, the generated menu screen data, and information for navigating to each segment based on the time stamp information,
    wherein the selection module is further configured to select an image other than a face image appearing within a predetermined time from the beginning of the segment and a face image appearing within a predetermined time from the end of the segment.

2. The device of claim 1, further comprising:
    an optical disc device configured to write the data in the optical disc.

3. The apparatus of claim 1, wherein
    a number of buttons displayed in the menu screen is equal to or smaller than a predetermined number.

4. An authoring apparatus configured to generate data from a video content data, the data being used to reproduce the video content data and to be stored in an optical disc, comprising:
    an indexing processor configured to generate face image indexing information comprising face images in moving image data which is comprised in the video content data and time stamp information indicative of a time when each image appears in the video content data;
    a setting module configured to set segments along with a time axis in the video content data, wherein a number of the segments is equal to or smaller than a number of chapters;
    a selection module configured to select a face image in each segment based on the time stamp information comprised in the face image indexing information;
    a menu screen generator configured to generate menu screen data comprising buttons on a display screen, the buttons comprising the selected face images and to navigate to the segments comprising the selected face images;
    a data generator configured to generate the data comprising information of the video content data, the generated menu screen data, and information for navigating to each segment based on the time stamp information; and
    the selection module further configured to select a thumbnail image of an image in substantially the middle of the segment when no face image appears within the segment.

5. An authoring method of generating data from video content data, the data to be stored in an optical disc, comprising:
    generating face image indexing information comprising face images in moving image data which is comprised in the video content data and time stamp information indicative of a time when each face image appears in the video content data;
    setting segments along with a time axis in the video content data, a number of the segments is equal to or smaller than a number of chapters;
    selecting a face image in each segment based on the time stamp information comprised in the face image indexing information;
    generating menu screen data comprising buttons on a display screen, the buttons comprising the selected face images and to navigate the segments comprising the selected face images;
    generating the data comprising information of the video content, the menu screen data, and information for navigating to each segment based on the time stamp information; and
    selecting an image other than a face image appearing within a predetermined time from the beginning of the segment and a face image appearing within a predetermined time from the end of the segment.

6. An authoring method of generating data from video content data, the data to be stored in an optical disc, comprising:
    generating face image indexing information comprising face images in moving image data which is comprised in the video content data and time stamp information indicative of a time when each face image appears in the video content data;

setting segments along with a time axis in the video content data, a number of the segments is equal to or smaller than a number of chapters;

selecting a face image in each segment based on the time stamp information comprised in the face image indexing information;

generating menu screen data comprising buttons on a display screen, the buttons comprising the selected face images and to navigate the segments comprising the selected face images;

generating the data comprising information of the video content, the menu screen data, and information for navigating to each segment based on the time stamp information; and selecting a thumbnail image of an image in substantially the middle of the segment when no face image appears within the segment.

* * * * *